Aug. 15, 1950   L. W. VAN DUSEN   2,518,650
JUICE EXTRACTOR
Filed April 21, 1947   2 Sheets-Sheet 2
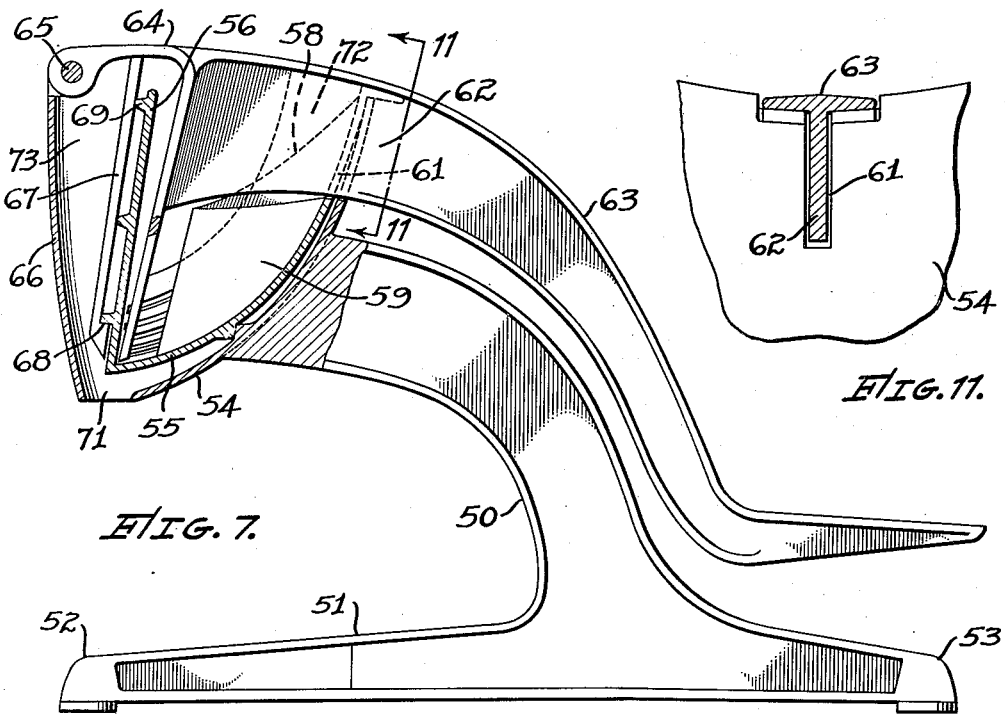
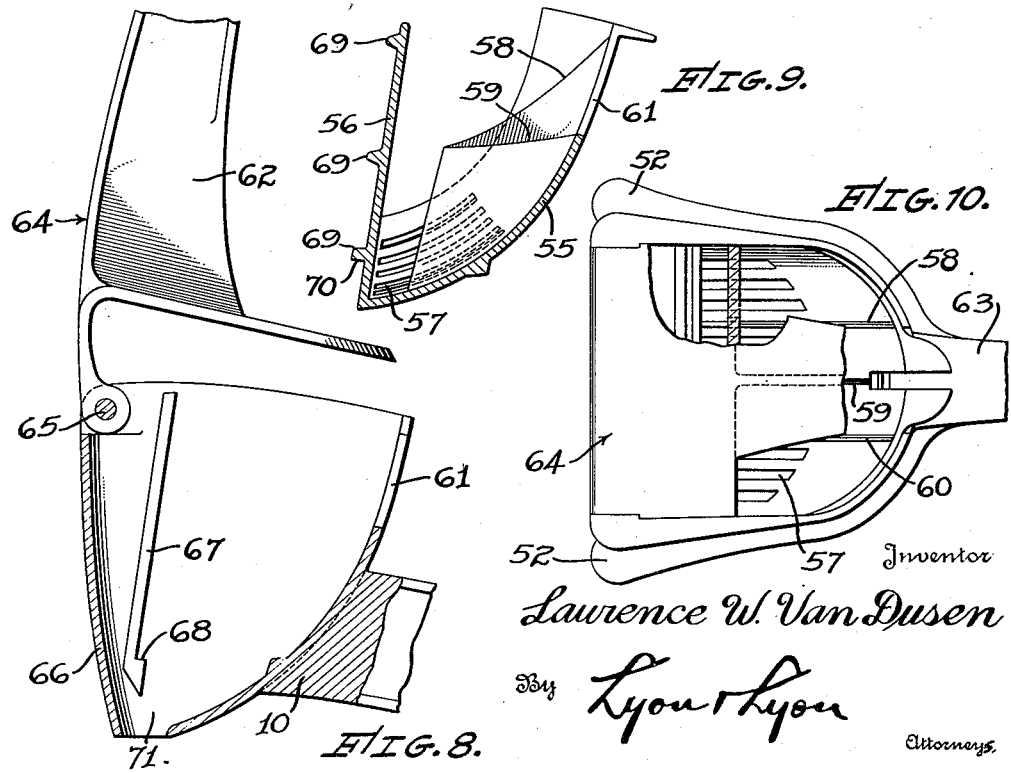
Inventor
Laurence W. Van Dusen
By Lyon & Lyon
Attorneys Patented Aug. 15, 1950

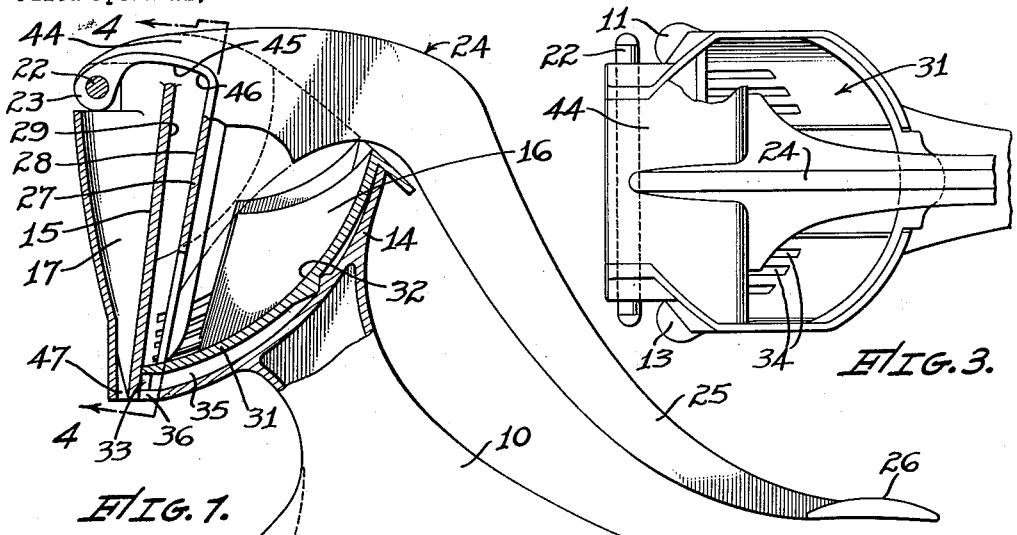
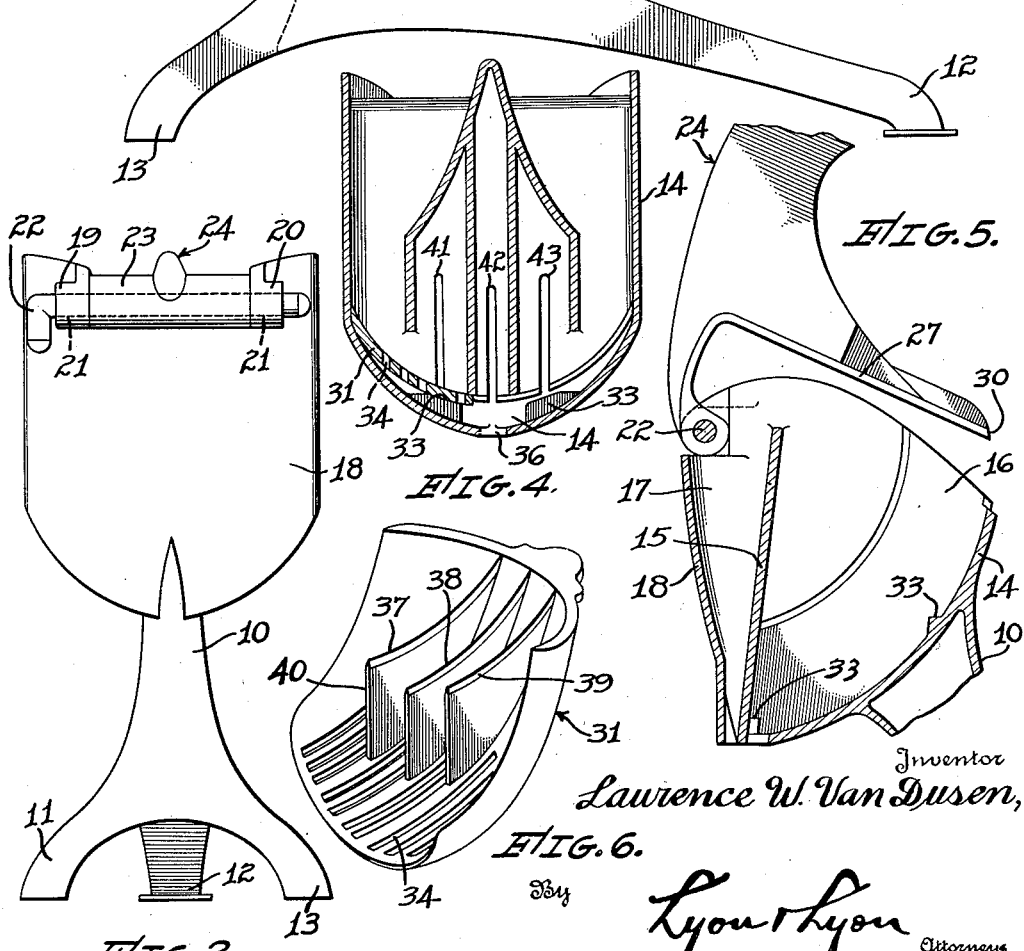

2,518,650

UNITED STATES PATENT OFFICE 2,518,650

JUICE EXTRACTOR

Laurence W. Van Dusen, San Diego, Calif., assignor to Van Dusen Engineering Company, San Diego, Calif., a copartnership Application April 21, 1947, Serial No. 742,769

3 Claims. (Cl. 100—41)

This invention relates to a juice extractor, and is particularly directed to a device which will squeeze citrus fruits such as oranges or lemons in a rapid and efficient manner without requiring that the fruit be cut in two before squeezing.

The principal object of this invention is to provide a juice extractor which will squeeze a whole fruit without requiring that the fruit be cut in two before squeezing.

Another object is to provide a squeezer type juice extractor which operates in a very rapid and efficient manner.

Another object is to provide a juice extractor having a bowl and a pivoted platen movable in the bowl toward a stationary abutment, the location of the pivotal axis being displaced from the stationary abutment to avoid loss of juice by escape through the pivotal connection.

Another object is to provide a juice extractor of this type in which the relation of the platen and abutment faces to the position of the pivotal hinge point produces a rolling action on the fruit during squeezing which facilitates the breakup of the juice cells and thus releases the juice more readily.

Another object is to provide a juice extractor of this type having a plurality of stationary blades in the bowl which act to cut the fruit during the squeezing action and thus materially assist in extracting juice from the fruit.

Another object is to provide such a device in which the stationary blades terminate short of the fixed abutment to provide space for accumulation of the squeezed fruit so that it may be subsequently removed from the bowl without interference from the knives.

A further object is to provide a juice extractor of this type in which certain of the knives are located at a lower elevation than others to support the fruit at a relatively high elevation initially and to center the fruit laterally of the bowl.

A still further object is to provide a relatively deep bowl having a relatively small opening and pivotally attaching the platen to the bowl at a point displaced from the stationary abutment so that adequate room is provided for expansion of the fruit when flattened out during the squeezing action and crowding of the fruit into a corner is avoided.

Other objects and advantages will appear hereinafter.

In the drawings:

Figure 1 is a side elevation, partly in section, showing a preferred embodiment of my invention.

Figure 2 is a front elevation thereof.

Figure 3 is a plan view, partly broken away, showing the bowl and its related parts.

Figure 4 is a sectional view taken substantially on the lines 4—4 as shown in Figure 1.

Figure 5 is a fragmental side elevation showing the bowl in section and showing a portion of the platen.

Figure 6 is a perspective view showing a removable strainer member and illustrating the position of the stationary knives thereon.

Figure 7 shows a side elevation, partly in section, of a modified form of my invention.

Figure 8 is a side elevation, partly in section, showing the bowl and movable platen.

Figure 9 is a longitudinal sectional view of the strainer member employed in connection with the modified form of my invention.

Figure 10 is a plan view, partly broken away, and showing the bowl and its related parts illustrated in Figure 7.

Figure 11 is a sectional detail partly broken away taken substantially on the lines 11—11 as shown in Figure 7.

Referring to the drawings, and specifically to that form of the invention shown in Figures 1 to 6 inclusive, the base 10 may be provided with three supporting feet 11, 12 and 13 adapted to rest on any level surface such as a table. A bowl member 14 is carried on the upper end of the base 10 and is provided with a partition or stationary abutment 15 extending upwardly within the bowl 14 to separate the fruit receiving cavity 16 from the drainage chamber 17. The rear wall 18 of the bowl member 14 forms one side of the drainage chamber 17 and the upstanding abutment 15 forms the other side. A pair of rearwardly extending ears 19 and 20 are formed integrally with the upper portion of the wall 18 and provided with aligned openings 21 for reception of the removable hinge pin 22. Pivotally mounted on the hinge pin 22 by means of a boss 23 is a movable platen generally designated 24. Platen 24 is provided with a forwardly and downwardly projecting operating handle 25 having a pad 26 at its extreme end. Also carried on the platen 24 is a squeezer member 27 having a working face 28 adapted to squeeze a fruit such as, for example, a citrus fruit between the face 28 and the working surface 29 of the abutment 15. The squeezer member 27 extends into the cavity 16, and arranged to conform with the travel of its outer edge 30 is a strainer member 31. The strainer member 31 is removably mounted within the bowl 14 and defines a curved forward wall 32 of a cavity 16. Setting lugs 33 are provided on the bowl 14 for engagement with complementary portions of the removable strainer member 31 to support the latter in position within the bowl 14. A plurality of elongated apertures 34 are provided in the strainer member 31 to allow juice to pass downwardly therethrough into the space 35 and outwardly through the discharge port 36 in the bowl into a container or receptacle, not shown. Fixed on the strainer member 31 and positioned in parallel relationship are a plurality of upwardly extending knives 37, 38 and 39. It should be noted that these knives do not extend into contact with the abutment 15, but, on the contrary, terminate at 40 to leave a space between their ends 40 and the abutment 15. The purpose of this space will be described hereinafter.

As shown in Figure 6, the lower extreme edge of the strainer member 31 rests on the lugs 33. The strainer member 31 is broken away on the right hand side of Figure 6 in order to clearly illustrate the position and functioning of the slots which are positioned in the squeezer member 27 of the platen 24. These slots 41, 42 and 43 are parallel and each receives one of the knives in sliding relation when the platen 24 moves about its hinge pin 22 to bring the squeezer member 27 in proximity to the abutment 15. Thus, the knife 39 is received within the slot 41, the knife 38 within the slot 42 and the knife 37 within the slot 43.

A boss 23 on the platen 24 is connected by an arch portion 44 to the squeezer member 27, and the underside of this arch portion is formed as a deflector surface 45 which joins with the surface 28 in a smooth radius 46. The deflector surface 45 extends laterally over the entire cavity 16 and over the drainage chamber 17.

In operation, the platen member 24 is pivoted to an inoperative position with the squeezer member 27 outside the cavity 16 to permit insertion of the strainer member 31. A whole fruit such as an orange is then placed in the bowl and rested on the upper edges of the knives 37, 38 and 39. The fruit is automatically centered laterally of the bowl since the knife 38 has its upper edge positioned at a lower elevation and the fruit is thus initially maintained in a relatively high position in the bowl. The handle 25 of the platen 24 is then rotated in clockwise direction as viewed in Figure 1 to bring the squeezer member face 28 into contact with the fruit, not shown. Continued movement of the platen 24 forces the fruit through the knives 37, 38 and 39 thereby cutting the rind and the pulp of the fruit in three places, but avoiding severance of the fruit into separate parts. The bowl is formed relatively deep so that adequate space is available in front of the abutment surface 29 to permit the fruit to flatten out in every direction without crowding into any corner of the bowl. The force applied between the face 28 and abutment surface 29 is therefore effective to extract substantially all of the juice without requiring excessive force on the handle 25. The juice expelled from the fruit passes downwardly through the aperture 34 in the strainer member 31 and into the space 35 within the bowl 14. The juice then pours from the discharge port 36 into a container, not shown. During the squeezing process, juice may be expelled in an upward direction, and, if this occurs, such juice is not allowed to escape through the hinge point but is deflected by the surface 45 over the top of the abutment 15 and into the drainage chamber 17. A discharge port 47 at the lower end of the chamber 17 discharges juice into the same container.

When the juice has been extracted from the fruit, the handle 25 is rotated in a counter-clockwise direction, as viewed in Figure 1, to move the squeezer member 27 out of the cavity 16. The platen 24 is rotated counter-clockwise almost 180 degrees so that the entire upper portion of the bowl is exposed. In this position the pulp and rind of the fruit which has been squeezed may be manually removed from the cavity 16. This squeezed fruit to be removed is in the form of a flat biscuit and it is easily withdrawn manually because no interference is offered by the knives 37, 38 and 39. The biscuit or squeezed fruit, as it is hereinafter described, is positioned in the space between the abutment surface 29 and the ends 40 of the blades so that the blades do not contact the squeezed fruit during the removal operation. After the squeezed fruit has been discarded and another whole fruit is inserted, the sequence of operations is repeated. It has been found by actual test that this device will squeeze a greater quantity of juice in the same time interval than any conventional squeezer type juice extractor. This advantage accrues from the ability to squeeze a whole fruit and thus the time normally required for cutting the fruit prior to squeezing is saved. Furthermore, only a single biscuit of pulp and rind need be withdrawn for each whole fruit instead of withdrawing halves or smaller portions.

In the modified form of my invention shown in Figures 7 to 11, the base 50 is of somewhat different design from the former embodiment described above and includes a horizontally projecting portion 51 provided with feet 52 and 53. A bowl 54, carried by the base, is adapted to receive a removable strainer member 55 upon which an abutment member 56 is integrally formed. The strainer member 55 is provided with apertures 57 and parallel knives 58, 59 and 60, and the upper surface of the central knife 59 is lower than the knives 58 and 60. A slot 61 is formed centrally in the strainer member 55 and extends upwardly from the termination of the blade 59. Slot 61 is adapted to receive a downwardly extending fin 62 forming a part of the handle 63 on the platen member, generally designated 64. This platen 64 is pivotally secured to the bowl 54 by means of the hinge pin 65 positioned at the upper end of the rear wall 66 of the bowl 54. Ribs 67 are positioned on opposite sides of the bowl 54 and provided with lugs 68 at their lower ends. Projections 69 on the back side of the abutment member 56 are adapted to rest against the ribs 67 and the shoulder 70 on the abutment member 56 is adapted to be supported on the lugs 68.

As will be understood from the foregoing description, the principal distinction between the modification shown in Figures 7 to 11 over that previously described is that the strainer member 55 carries the abutment member 56 integrally therewith and that no partition is provided within the bowl 54. Only a single discharge port 71 is provided and this port communicates with the cavity 72 within the strainer member 55 and also with the drainage chamber 73 defined between the rear wall 66 and the abutment member 56.

Slots are provided in the movable platen 64 to receive the blades 58, 59 and 60 in sliding relation. The operation of this form of my invention is substantially the same as that described in connection with the form of invention shown in Figures 1 to 6 inclusive and therefore need not be repeated here.

Having fully described my invention, it is to be understood that I do not wish to be limited to the details herein set forth, but my invention is of the full scope of the appended claims.

I claim:

1. In a juice extractor for citrus fruits, and the like, the combination of a bowl member having a cavity adapted to receive a whole fruit, a plurality of stationary parallel knives in the cavity having curved end portions adapted to support a fruit initially at a relatively high elevation in the cavity, the end portions of adjacent knives being disposed at different heights to conform to the shape of the fruit and thereby act to center the fruit laterally within the cavity, a stationary abutment in the cavity, and a movable platen pivotally mounted on the bowl member and having slots each receiving one of the knives, the platen being movable in the cavity to move the fruit through the knives and squeeze it against the abutment.

2. In a juice extractor, the combination of a bowl member having walls defining a fruit receiving cavity, one of said walls comprising a stationary upwardly extending abutment, a movable platen having a face adapted to squeeze fruit against said abutment, and pivotal means positioned on the opposite side of the abutment from the platen face for securing the platen on the bowl member, a portion of said movable platen providing a deflector surface on the movable platen joining with said platen face and adapted to span over the upper end of the abutment, said deflector surface being adapted to prevent upward escape of juice during squeezing of the fruit.

3. In a juice extractor, the combination of a bowl member having an upwardly extending partition therein defining a fruit receiving cavity and a spill chamber within the bowl member, and a movable platen pivotally mounted on the outer wall of the spill chamber and having a face adapted to move in the cavity to squeeze fruit against the partition, a portion of said movable platen providing a deflector surface on the movable platen joining with said platen face and adapted to span over the upper end of the partition, said deflector surface being adapted to divert upwardly moving juice from the cavity into the spill chamber during squeezing of the fruit.

LAURENCE W. VAN DUSEN.

REFERENCES CITED

The following references are of record in the file of this patent:

UNITED STATES PATENTS

| Number | Name | Date |
|---|---|---|
| 590,221 | Heath | Sept. 21, 1897 |
| 609,695 | McKee | Aug. 23, 1898 |
| 796,341 | Middlekauff | Aug. 1, 1905 |
| 1,152,933 | Cooper | Sept. 7, 1915 |
| 1,180,959 | Turner | Apr. 25, 1916 |
| 1,886,250 | Bungay | Nov. 1, 1932 |
| 1,910,559 | Morin | May 23, 1933 |
| 2,111,997 | Stephens | Mar. 22, 1938 |